Figure 1:
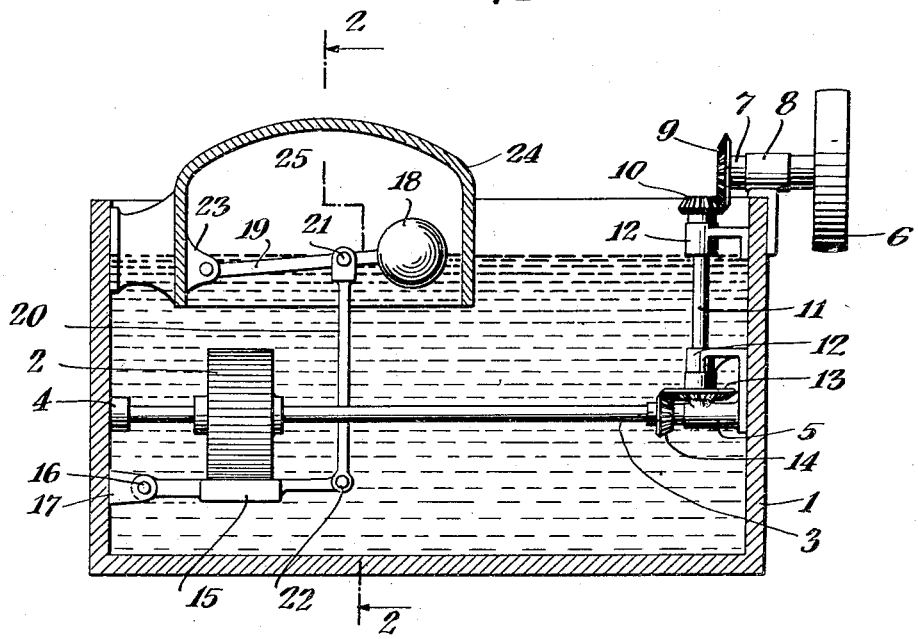

Aug. 18, 1931.   G. F. ARCHER   1,819,057

CONTROLLED WATER HEATING MEANS

Filed Feb. 18, 1931

Inventor
George F. Archer
By his Attorney
Frederick W. Barker

Patented Aug. 18, 1931

1,819,057

UNITED STATES PATENT OFFICE

GEORGE F. ARCHER, OF NEW YORK, N. Y.

CONTROLLED WATER HEATING MEANS

Application filed February 18, 1931. Serial No. 516,759.

This invention relates to means for heating a contained body of water, and means for controlling the operation of the heating means for the purpose of maintaining a fairly constant temperature in the body of water.

To this end my improvement consists in the provision of heating means whose operation depends upon the buoyed position of a float that is supported in a body of water to be heated, said buoyed position being located near the water level and in a restricted area of the body of water whose surface is enclosed by a dome that is partly immersed in said body of water.

As means for creating heat for raising the temperature in the body of water I may employ a friction wheel that is provided with means for rotating it at high speed, and a brake or shoe in contact with the periphery of the wheel, the brake being connected with the float so that with a rise in temperature, generating steam in the dome and a consequent fall of the water level in the dome, thereby the brake will be removed from frictional contact with the wheel; and upon condensation of the vapor in the dome and the consequent rise of the water level therein, thereby the frictional contact between the brake and wheel will be re-established.

Other features and advantages of my invention will hereinafter appear.

Figure 2:
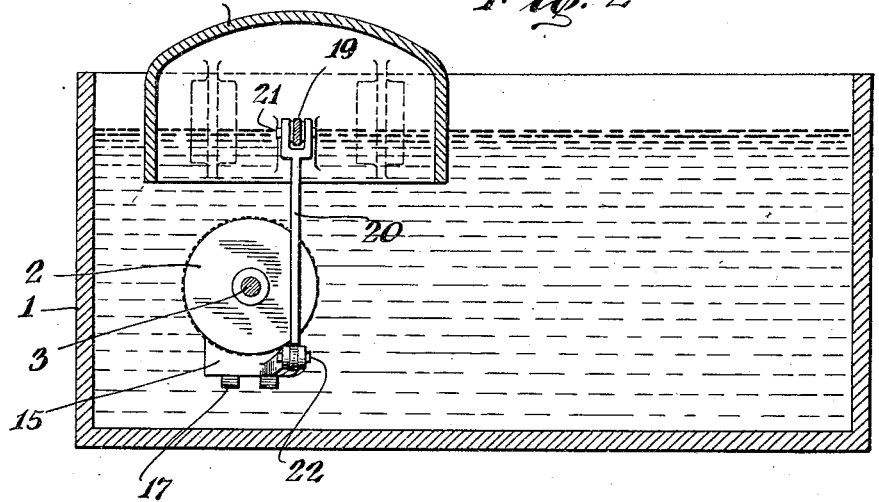

In the drawings:

Figure 1 is a vertical sectional view of a receptacle containing a body of water, together with my improved heating means, and controlling means therefor, and Fig. 2 is a section on the line 2—2 of Fig. 1.

In said views let 1 indicate a tank or suitable receptacle, which may be of any suitable material and dimensions, and which contains a body of water.

As means for heating the water I place within the receptacle a pulley 2 which is carried by a shaft 3 that is suitably journalled in fixed bearings, as indicated at 4, 5. The shaft 3 is driven as from a pulley 6, which may be operated by a suitable source of power (not shown) through suitable gearing.

As shown, the pulley 6 rotates a stub shaft 7, journalled in a fixed bearing 8, and has a bevel gear 9 that meshes with a bevel gear 10, said gear 10 rotating a shaft 11, journalled in fixed bearings 12 and carrying a bevel gear 13 which meshes with a bevel gear 14 carried by the shaft 3.

Obviously the power transmitting means herein shown and described is only arbitrary, and non-limiting.

A brake 15, pivoted as at 16 to a fixed bearing 17, is normally held in frictional contact with wheel 2 by means of a float 18 having an arm 19 that is in engagement with the brake as by means of a connecting rod 20, pivoted to arm 19 at 21 and to the brake at 22.

The float arm 19 is in pivotal engagement with a lug 23, extended from the wall of a dome 24, said dome being secured, in a fixed position, within the receptacle, and having its open end immersed within the body of water. In the example illustrated a clearance 25 is indicated in the dome above the water level therein although obviously the dome may be completely immersed.

Now it will be obvious that upon a rise in temperature in the water trapped within dome 24, sufficient for the generation of steam, in consequence the level of the trapped water will fall, and the float is so buoyed in this trapped water that a slight recession in the level will cause the fluid, through connecting rod 20 to release the brake 15 from its frictional contact with wheel 2, whereupon the generation of heat will cease.

As the steam in the dome condenses and thereby restores the volume of trapped water therein, the float will again rise and press the brake against the wheel 2, whereupon the creation of frictional heat will be resumed, to in this manner automatically maintain the temperature in the body of water.

Variations within the spirit and scope of my invention are equally comprehended by the foregoing disclosure.

I claim:

1. Means for heating a body of water comprising a wheel journalled therein, means for rotating said wheel, a brake to frictionally engage said wheel, a float buoyed in said body of water, a dome within which said float is pivoted, said dome entrapping a restricted area of said body of water, and means connecting said float and brake whereby said brake will be released from contact with said wheel in a fall of the water level.

2. The combination with means for heating a body of water, of a float buoyed therein, a dome within which said float is pivoted, said dome entrapping a restricted area of said body of water, and means intermediate said float and heating means for the control of the latter with the fall and rise of the water level in the dome.

New York, N. Y., February 13th, 1931.

GEORGE F. ARCHER.